Patented Feb. 6, 1923.

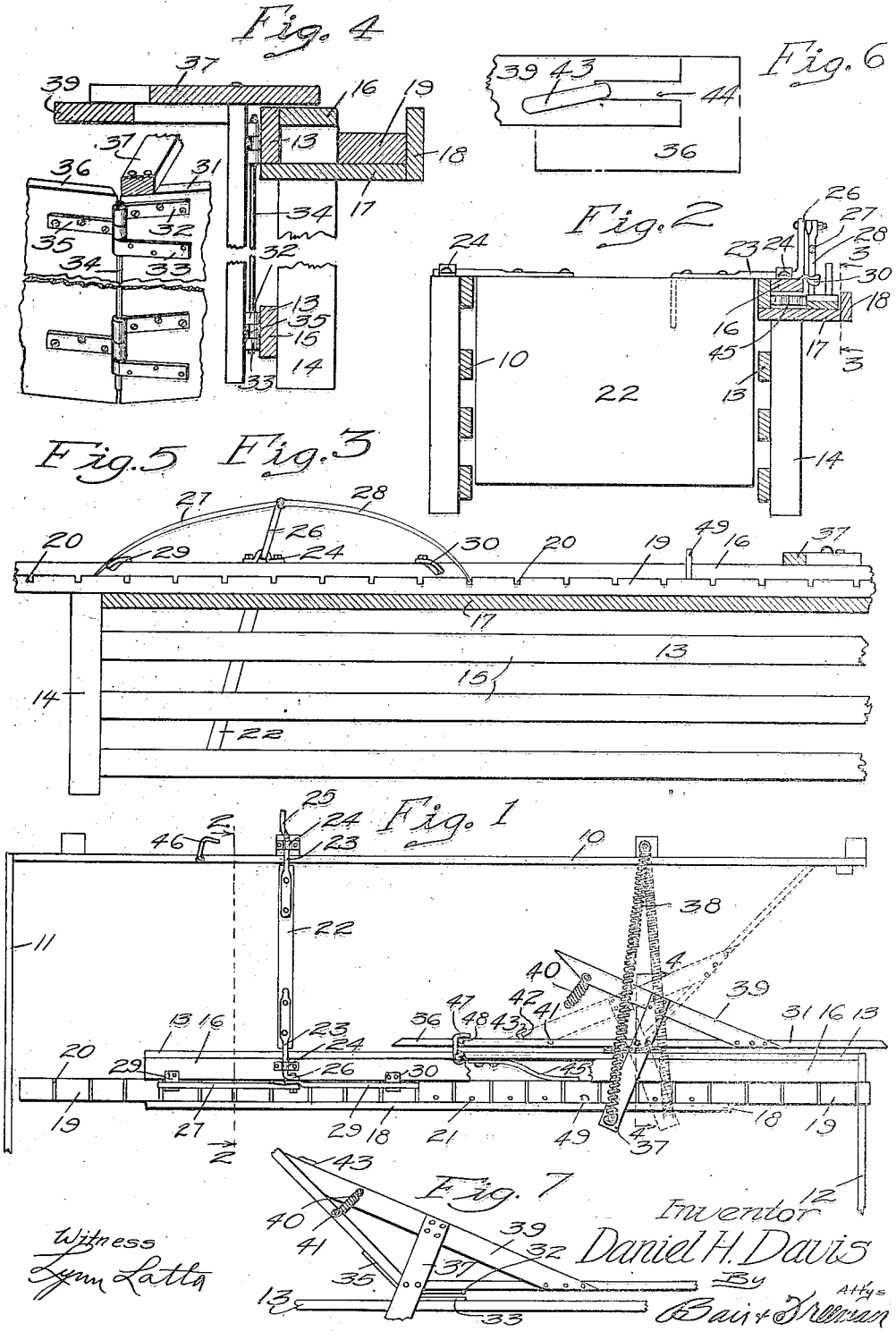

1,444,237

UNITED STATES PATENT OFFICE.

DANIEL H. DAVIS, OF UNION, IOWA.

GATE.

Application filed September 6, 1921. Serial No. 498,776.

*To all whom it may concern:*

Be it known that I, DANIEL H. DAVIS, a citizen of the United States, and a resident of Union, in the county of Hardin and State of Iowa, have invented a certain new and useful Gate, of which the following is a specification.

The object of my invention is to provide a gate for hog lots and the like, which is so constructed and so arranged as to be operated by the hogs themselves so that they may be self-protecting.

More particularly, it is my object to provide such a gate structure, having parts so arranged that when the gate is set for the purpose, the passage of one hog therethrough will operate to close the gate.

Still a further object is to provide such a structure, which can be arranged at the entrance to a pen and set so that the inner passage of one hog will close the gate, and capable of being adjusted or set so as to allow the inward passage of any desired predetermined number of hogs.

A further object is to make such a gate with parts so arranged that hogs may leave the pen through the gate at any time without being interfered with by the gate.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a top or plan view of a gate structure embodying my invention.

Figure 2 shows a detail, sectional view taken on the line 2—2 of Figure 1.

Figure 3 shows a detail, sectional view taken on the line 3—3 of Figure 2.

Figure 4 shows a detail, sectional view taken on the line 4—4 of Figure 1.

Figure 5 shows a detail, perspective view of a portion of the movable gate members.

Figure 6 is a detail view of a portion of one of the gate members and the brace; and Figure 7 shows a top view of the gate in one of its adjusted positions.

My gate structures are designed to be used in connection with separate or individual hog pens.

In the accompanying drawings, I have used the reference numeral 10 to indicate a fence or the like. The fence 10 is connected at one end with a fence 11 extending for instance at right angles thereto and forming one of the walls of the fences of the pen.

It will be understood that if the wall 10 is the front wall and the wall 11 one of the side walls, then the pen has the back wall and the other side wall or fence 12.

A fence 13 extends from the fence 12 parallel and spaced from the fence 10 to a point spaced from the fence 11 as shown in Figure 1. It will thus be seen that there is a runway between the fences 10 and 13 open at one end and closed at the other end by the fence 11.

The fence 13 terminates at such a point spaced from the fence 11 as to permit free passage from the runway into the pen.

It will be understood that the fence 13 has the posts 14 and the boards or other fence material 15 as shown for instance in Figure 3.

Supported on the posts 14 is a filler block 16 arranged at the top of said posts. Extending laterally into the pen from the filler block 16 and the posts 14 is a flat board or the like 17, at the inner edge of which is an upwardly extending board or the like 18.

It will be seen that the filler block 16 and board 18 form the sides and that the board 17 forms the bottom of a guide or trough. In the guide or trough thus formed, there is slidably mounted a bar 19 in which I provide a series of equi-distantly spaced transverse grooves 20. The grooves 20 are in the upper surface of the bar 19, which I will call the slide bar. Near one edge of the slide bar 19 farthest from the fence 13, the bar is provided with a series of holes 21 arranged between the successive slots 20, as shown in Figure 1.

A swinging gate 22 is hung between the fences 13 and 10 not far from the end of the fence 13 nearest the fence 11, as shown in Figure 1.

Secured to the top of the swinging gate 22 are pintles 23, which are mounted in bearings 24 on the tops of the posts of the respective fences 13 and 10. The pintles 23 may be in the form of rods. On the pintle 23, which is journaled on the fence 10, is a crank handle 25. The pintle 23 at the opposite side of the gate 22 has an upwardly extending arm 26.

Pivoted to the upwardly extending arm 26 are oppositely extending curved relatively long pawls 27 and 28, the free ends of which rest on the top of the slide bar 19 and are adapted to drop into the grooves 20.

It will thus be seen that when the gate 22 is swung from its hanging vertical position upwardly in either direction, the arm 26 will be inclined and one of the pawls 27 or 28, as the case may be, will enter one of the notches 20 and move the slide bar 19.

In order to prevent the return movement of the slide bar when the gate drops again to vertical position, I have provided on the filler bar 16 a pair of projecting guide plates 29 and 30 below the pawls 27 and 28 near the free ends thereof. Thus it will be seen by an inspection of Figure 3, that if the gate 22 is swung upwardly toward the left, the pawl 28 will engage one of the notches 20 and slide the bar 19 toward the right. The pawl 27 will then slide upon the guide plate 29, so that when the gate 22 swings downwardly, the pawl 27 will not return the bar 19 to its original position.

Spaced from the gate 22 toward the entrance end of the runway between the fences 10 and 13 is a double gate member. One of said gate members 31 is hinged by the members 32 and 33 and the pintle 34 to the fence 13. The member 32 is secured to the gate member 31, and the member 33 to the fence 13.

Between the members 32 and 33 is a hinge member 35 mounted on the pintle 34 and secured to a gate member 36 similar in construction to the gate member 31. There are two or more of said hinge structures, vertically spaced.

The gate members 31 and 36 are wider than the runway, so that they can not be swung to position transversely of the runway.

In Figure 1, I have shown the gate 31 in full lines in open position and in dotted lines in closed position, where it extends diagonally across the runway.

Fixed to the top of the gate member 31 near the hinged edge thereof is an arm 37 projecting in both directions from the gate member 31 and inclined from a right angle with relation to the gate 31, as shown in Figure 1. Secured to the end of the arm 37, which projects over the slide bar is a coil spring 38 which is also secured to one of the posts of the fence 10. The arm 37 is so arranged that when the gate 31 is in open position, as shown in Figure 1, the arm has been moved past center and the spring 38 will tend to hold the gate in open position, whereas when the gate 31 is moved to closed position, as shown by dotted lines in Figure 1, the arm 37 will swing over center and the spring 38 will tend to hold the gate 31 in such closed position.

Secured to the upper part of the gate 31, as shown in Figure 1, is a brace 39 inclined away from the gate 31 and toward the hinged end thereof and projecting substantially beyond the hinged end thereof, as illustrated. The end of the arm 37, which projects above the runway is secured to said brace 39.

Secured to the free end of the brace 39 is a coil spring 40, which may be hooked over a pin 41 on the gate member 36 for yieldingly connecting the gate members 31 and 36 and holding them in such position that they form a wide-mouthed V.

Mounted in the gate member 36 for rotation is a short rod 42 having a head 43 arranged at right angles to the body of the rod. In the brace 39 in the end thereof farthest from the gate 31 is a slot 44, illustrated in Figure 6, through which the rod 42 projects when the gates 31 and 36 are connected together. The rod 42 may be rotated for causing the head 43 to engage the brace 39 for locking the two gate members together.

Underneath the filler block or strip 16, a flat spring 45 is provided for bearing against the side of the slide bar 19 for holding it snugly against the guide wall or board 18. The filler block 16 is broken away in Figure 1 to show such operation.

Mounted on the fence 10 is a swinging hook member 46, which, when gate 22 is fully raised, may be swung to position for holding it in raised position, by projecting the free end of the hook 46 into a hole in the edge of the gate 22 or beneath the gate 22.

Pivoted to the fence 13, is a hook 47, which is designed to coact with a pin 48 at the top of the gate member 36 for locking said gate in its open position, as shown in Figure 1. A pin 49 is designed to be selectively mounted in one of the holes 21 for the purpose of engaging the lever 37 when the slide bar 19 moves to a certain position of its movement in a manner that will be hereinafter more fully described.

I will now explain the practical operation of my improved gate structure and such explanation will make more clear the construction and arrangement of the parts.

Assuming that it is desired to use several of the pens equipped with my gate structure in a hog lot, in which there are a number of brood sows, and assume that it is desirable to arrange the gate structure so that one sow only can enter a pen and upon her entrance will shut the gates, so that she may be alone in the pen, if she desires.

In such case, the gate 22 is raised and held in raised position by the hook member 46. The gate members 31 and 36 are connected together by means of the spring 40 and the pin 41, and the gate 31 is left in its open position as shown in Figure 1, and it will be seen that the gate 36 will then be in its closed position.

If one hog desires to enter the pen, it may walk in through the runway pushing against the gate 36 and opening it and thereby swinging the gate 31 toward closed position until the arm 37 swings past center whereupon the spring 38 will hold the gate 31 in closed position. Owing to the yielding connection of the gate members 31 and 36, the gates will not bind on the hog. The hog may then enter the pen and will be free from interference or excitement. No other hog can enter the pen, however, the hog, which is in the pen may readily leave the pen by walking out through the runway and pushing the gate 31 to open position, which will move the gate 36 to closed position, as the arm 37 swings over center.

Assuming, however, that it is desired to arrange the gate so that six hogs may enter the pen, the rod 42 is rotated for releasing the brace 39 and the spring 40 is released. The gate 36 is then secured against the fence 13 by means of the hook 47 and pin 48. The gate 31 is swung to open position and will be held there by the spring 38. The gate 22 is released and lowered. The pin 49 is set in the proper hole 21 and the slide bar 19 is then moved to such position that five inward swings of the gate 22 will cause the pawl 28 to five times advance the slide bar 19. The pin 49 is so set that on the sixth sliding movement of the bar 19, said pin will engage the arm 37 and swing it past center for closing the gate 31, thus limiting the number of hogs that can enter the pen.

It will be noted that after any certain number of hogs, less than seven, has entered the pen, as for instance six, any one of the hogs may freely leave the pen to go out to the water trough or otherwise. Upon leaving the pen, the gate 22 will be swung and will cause the pawl 27 to move the bar 19 one notch toward the left, thus leaving the bar 19 in such position that one more hog may enter the pen and join the five already therein.

The hogs finding that they can readily leave the pen will have no hesitancy about entering it.

When the gates are arranged in the first of the positions above-mentioned, to-wit with the gates 31 and 36 connected, the hogs soon learn that upon entering the pen, they are free from interference by other animals, and they freely enter and leave the pen.

The advantage of having such a structure is very obvious. A farrowing sow can enter the pen when she desires and close the gate and the stockraiser is freed from the necessity of being constantly on the watch.

The advantages of such a gate structure as has been described will be largely obvious from the foregoing description.

Attention may be called to the fact, however, that it is highly desirable in caring for brooding sows before farrowing that the sows should be able to go into one of the pens and be free from annoyance and interference.

It will be seen that by properly setting the gate, one sow may go into the pen and she will shut the gate, so that she may remain in the pen without interference on the part of the other hogs. However, she may freely walk out of the pen and when she does so, will open the gate, so that the same sow or another sow may afterward go into the pen and close the gate.

It is well-known that in raising hogs, and particularly on cold nights, the hogs will bunch up and pile up and frequently some of the hogs are smothered under the pile. With the increasing value of hogs and particularly of blooded stock, this imposes on the farmers severe losses, which can be avoided by the use of my gate.

It will be that by adjusting the pin in the slide bar, the gate can be set to permit the entrance of any desired number of hogs into any particular pen. Thus each gate can be seen so set that only a certain number of hogs can enter that gate. The farmer, will, of course, set the gate for different numbers of hogs depending upon the size and condition of the hogs in the large lot, and will set the gate so that only such number of hogs can enter any one pen, so that the hogs in the pen will be safe from being smothered in the pile.

Attention is called to the fact that the gate is automatic, so that it requires comparatively little attention on the part of the stock-raiser. As a matter of fact, the parts are very easily adjusted, if any readjustment or re-setting becomes necessary.

Some changes may be made in the construction and arrangement of the details of my improved gate structure, without departing from the real spirit and purpose of my invention, and it is my intention to cover by my patent, any modified forms of structure or use of mechanical equivalents, which may be reasonably included within the scope of my claims.

I claim as my invention:

1. In a device of the class described, a runway, a pair of spaced movable gates therein, one of said gates being supported to stand normally in closed position and to be moved by each animal passing in either direction through the runway, a movable device adapted to move the other gate to closed position, and means whereby the movement of one gate in one direction a predetermined number of times more than the number of its movements in the other direction actuates said movable device for closing the other gate.

2. In a device of the class described, a runway, a pair of spaced movable gates therein, one of said gates being supported to stand normally in closed position and to be moved by each animal passing in either direction through the runway, a movable device adapted to move the other gate to closed position, and means whereby the movement of one gate in one direction a predetermined number of times more than the number of its movements in the other direction actuates said movable device for closing the other gate, said movable device having an adjustable member by the adjustment of which said predetermined number may be varied.

3. In a device of the class described, the combination of a pen with a runway leading thereto, a gate in said runway adapted to be actuated by animals passing through the runway in either direction, so that the gate is closed by the entrance of an animal and opened by the exit thereof, said gate being pivoted at one edge to swing from position parallel with the runway to position extending diagonally across the runway, an arm connected with said gate and a spring connected with said arm and with a fixed member and tending to yieldingly hold said gate in either closed or open position assumed by the gate, a second gate member pivoted to said first gate member, means for yieldingly connecting said gate members together to form substantially a V.

4. In a device of the class described, the combination of a pen with a runway leading thereto, a gate in said runway adapted to be actuated by animals passing through the runway in either direction, so that the gate is closed by the entrance of an animal and opened by the exit thereof, said gate being pivoted at one edge to swing from position parallel with the runway to position extending diagonally across the runway, an arm connected with said gate and a spring connected with said arm and with a fixed member and tending to yieldingly hold said gate in either closed or opened position assumed by the gate, a sliding bar for engaging said arm, a swinging gate mounted in said runway and pivotally supported at its upper edge, said slide bar having a series of notches in its surface, and pawls pivotally connected with said swinging gate for actuation thereby.

5. In a device of the class described, the combination of a pen with a runway leading thereto, a gate in said runway adapted to be actuated by animals passing through the runway in either direction, so that the gate is closed by the entrance of an animal and opened by the exit thereof, said gate being pivoted at one edge to swing from position parallel with the runway to position extending diagonally across the runway, an arm connected with said gate and a spring secured thereto tending to yieldingly hold said gate in either closed or opened position assumed by the gate, a sliding bar for engaging said arm, a swinging gate mounted in said runway and pivotally supported at its upper edge, said slide bar having a series of notches in its surface, and pawls pivotally connected with said swinging gate for actuation thereby, guide members, each adapted to raise one pawl when the other pawl is actuated for moving said slide bar.

6. In a device of the class described, the combination of a pen with a runway leading thereto, a gate in said runway adapted to be actuated by animals passing through the runway in either direction, so that the gate is closed by the entrance of an animal and opened by the exit thereof, said gate being pivoted at one edge to swing from position parallel with the runway to position extending diagonally across the runway, an arm connected with said gate and a spring secured thereto tending to yieldingly hold said gate in either closed or opened position assumed by the gate, a sliding bar for engaging said arm, a swinging gate mounted in said runway and pivotally supported at its upper edge, said sliding bar having a series of notches in its surface, and pawls pivotally connected with said swinging gate for actuation thereby, guide members each adapted to raise one pawl when the other pawl is actuated for moving said sliding bar, said pin being adjustable to different positions on said sliding bar.

7. In a device of the class described, a runway, a hinged gate therein adapted when in one position to extend diagonally and close the runway, yielding means for holding the gate in closed position when that position is assumed, a swinging member projecting into the runway, and means actuated by said swinging member when the swinging member has been actuated a predetermined number of times, for closing said gate.

8. In a device of the class described, a runway, a hinged gate therein adapted when in one position to extending diagonally and close the runway, yielding means for holding the gate in closed position when that position is assumed, a swinging member projecting into the runway, and means actuated by said swinging member when the swinging member has been actuated a predetermined number of times, for closing said gate, said means being adjustable for varying the number of actuations required for closing the gate.

9. In a device of the class described, a runway, a hinged gate therein adapted when in one position to extend diagonally and close the runway, yielding means for holding the gate in closed position when that position is assumed, a swinging member projecting into the runway, and means movable by the swinging member when the latter is moved either direction from normal by passing animals, said last means having a member adapted to close the gate when said means is moved a predetermined distance in one direction.

Des Moines, Iowa, August 29, 1921.

DANIEL H. DAVIS.